United States Patent [19]
Jackson et al.

[11] Patent Number: 5,535,441
[45] Date of Patent: Jul. 9, 1996

[54] METHOD AND DEVICE FOR CANCELING FREQUENCY OFFSETS

[75] Inventors: Tom Jackson, Frederick; Henry Eck, Germantown; Ray Lowe, Gaithersburg, all of Md.

[73] Assignee: Hughes Electronics Corp., Los Angeles, Calif.

[21] Appl. No.: 316,027

[22] Filed: Sep. 30, 1994

[51] Int. Cl.⁶ ..................................... H04B 1/16
[52] U.S. Cl. .................. 455/182.2; 455/3.2; 455/192.2; 455/196.1; 455/293; 455/314
[58] Field of Search .................. 455/190.1, 192.1–192.3, 455/196.1, 295, 296, 303, 311, 314–316, 182.1–182.3, 183.2, 3.2, 293; 375/344

[56] References Cited

U.S. PATENT DOCUMENTS 5,390,348  2/1995  Magin et al. ...................... 455/182.2

FOREIGN PATENT DOCUMENTS 3-284016  12/1991  Japan ............................... 455/192.2

Primary Examiner—Chi H. Pham
Attorney, Agent, or Firm—John I. Whelan; Gordon R. Lindeen, III; Wanda K. Denson-Low

[57] ABSTRACT

A method and device for canceling frequency offsets in received modulated signals. The frequency offset cancellation device includes a downconverter module, a channel unit and a control module. The downconverter module shifts received signals to a lower frequency. The channel unit searches the shifted received signals and demodulates them, and the control module adjusts the downconverter in accordance with frequency offset information generated by the channel unit, thereby continuously cancelling out any frequency offsets that may have occurred during frequency shifting.

14 Claims, 3 Drawing Sheets

METHOD AND DEVICE FOR CANCELING FREQUENCY OFFSETS

BACKGROUND OF THE INVENTION

Hybrid-earth-station (HES) systems include receivers capable of receiving and demodulating satellite signals modulated with both voice and data information. Typically, an HES receiving site includes a satellite dish coupled to several signal downconverter stages. The satellite dish is oriented toward the path of the satellite and receives a broadband transmission of Ku-band signals containing voice and data information. A downconverter stage on the satellite dish shifts the Ku-band signals down to L-band. The L-band signals are then transmitted along a cable to an L-band radio where another downconverter stage further shifts the frequency of the signals and retrieves the information carried on the signals.

In each instance of shifting, the incoming signals are shifted from one predetermined frequency bandwidth to another. One or more carrier frequencies, each modulated to carry voice or data information, may exist in the shifted bandwidth. Demodulators in the L-band radio each look for a particular carrier frequency in the shifted bandwidth to demodulate.

The downconverters often shift a band of frequencies more or less than desired. Such shifting inaccuracies can be caused by temperature changes in the oscillators located in the downconverters. Inaccurate shifting results in the signals arriving at the demodulators offset from the expected frequencies.

Voice information is particularly sensitive to any frequency offsets that originate in the HES receiver or at any other point prior to retrieving the information from the signal. Previously, receivers attempted to combat frequency offsets by using very accurate, but expensive, oscillators and frequency reference devices to ensure accurate frequency shifting.

Another approach to combatting frequency offsets is to use demodulators that have broad searching and tracking capability to individually search the frequency band for the particular carrier the demodulator has been assigned. However, the typical demodulator can only sweep small segments of a frequency spectrum at one time. After sweeping each small segment, the demodulator must jump to the next segment and again sweep for its assigned carrier frequency. An audible "click" occurs on a telephone communication line each time the demodulator jumps to another segment.

Accordingly, there is a need for an accurate receiver that is inexpensive and can adequately compensate for the frequency offsets that can occur in voice communications.

SUMMARY OF THE INVENTION

The present invention relates to a method and device for canceling frequency offsets in received modulated signals. The present invention provides a frequency tracking feedback loop having receiver circuitry that is inexpensive yet accurate enough for voice information demodulation, such as in telephone communications, all without compromising performance.

The device includes a downconverter module that receives the modulated signals in a predetermined frequency range and shifts the received signals to a lower frequency band centered at a first intermediate frequency (IF). A channel unit receives the first IF, shifts it to a second IF, demodulates at least one information signal from the band of signals centered at the second IF, and generates a frequency offset output. The frequency offset output is then used supply any needed adjustments to the aforementioned frequency shifts, thereby compensating for any detected frequency offset.

The method of the present invention includes the steps of receiving the modulated signals in a predetermined frequency range and shifting them to an IF. The expected signal is searched for in the IF, and any frequency offsets are calculated from that expected frequency. The frequency offset information is translated into offset correction data, and the offset correction data is fed back to correct for the detected error. The modulated signals are then continuously tracked after acquiring them.

The invention itself, together with further objects and attendant advantages, will be best understood by reference to the following detailed description, taken in conjunction with the accompanying drawings.

DETAILED DESCRIPTION OF THE DRAWINGS

Figure 1:
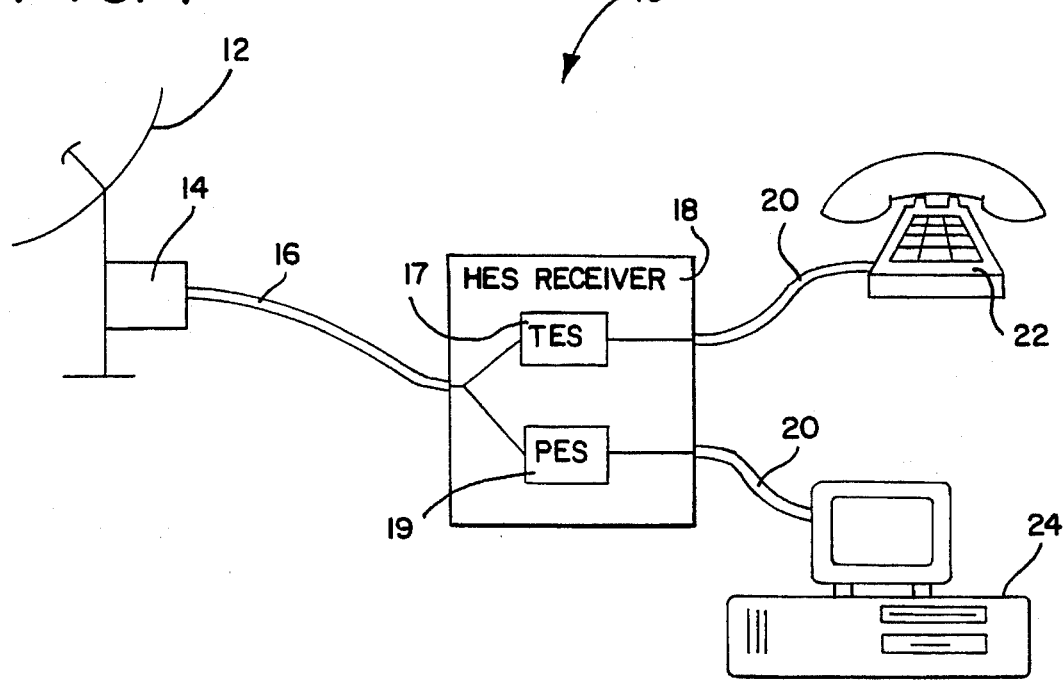
FIG. 1 is a diagram of a satellite dish and a hybrid earth station receiver.

FIG. 1 is a block diagram of a satellite receiver chain 10 embodying the present invention. The satellite receiver chain 10 has a satellite antenna 12 coupled to a Ku-band block downconverter 14 mounted on the antenna 12. The antenna 12 may be a satellite dish or other form of antenna appropriate for receiving Ku-band signals. The block downconverter 14 receives Ku-band signals from the antenna 12, shifts them down to L-band, and transmits the L-band signals through a cable 16 to the hybrid-earth-station (HES) receiver 18. The HES receiver 18 (shown in greater detail in FIGS. 2 and 3) splits the input signals into two paths, each carrying the identical L-band signals. One path is directed to a personal-earth-station (PES) receiver section 19, and the other path is directed to a telephony-earth-station (TES) receiver section 17. Both receiver sections 17, 19 shift the L-band signals to an even lower frequency band so that demodulators in the receiver sections 17, 19 can remove information from the received modulated signals. In addition, the receiver 18 detects and compensates for any signal offset in the received modulated signals regardless of whether the offset originated in doppler errors, errors in the block downconverter 14 or the receiver 18 itself. The HES receiver 18 outputs information signals along cables 20 to the proper voice or data receiving destinations 22, 24.

The present invention relates primarily to the TES receiver section 17 of the HES receiver 18. More particularly, the invention relates to the TES receiver section's 17 ability to detect and cancel frequency offsets introduced into the received modulated signals. By compensating for frequency offset in the manner disclosed herein, the TES receiver section 17 and the block downconverter 14 can be constructed of less expensive components. The PES receiver section 19 does not need the frequency offset cancellation hardware and software of the present invention because PES technology involves mainly data communications that are less sensitive to frequency offsets.

Figure 2:
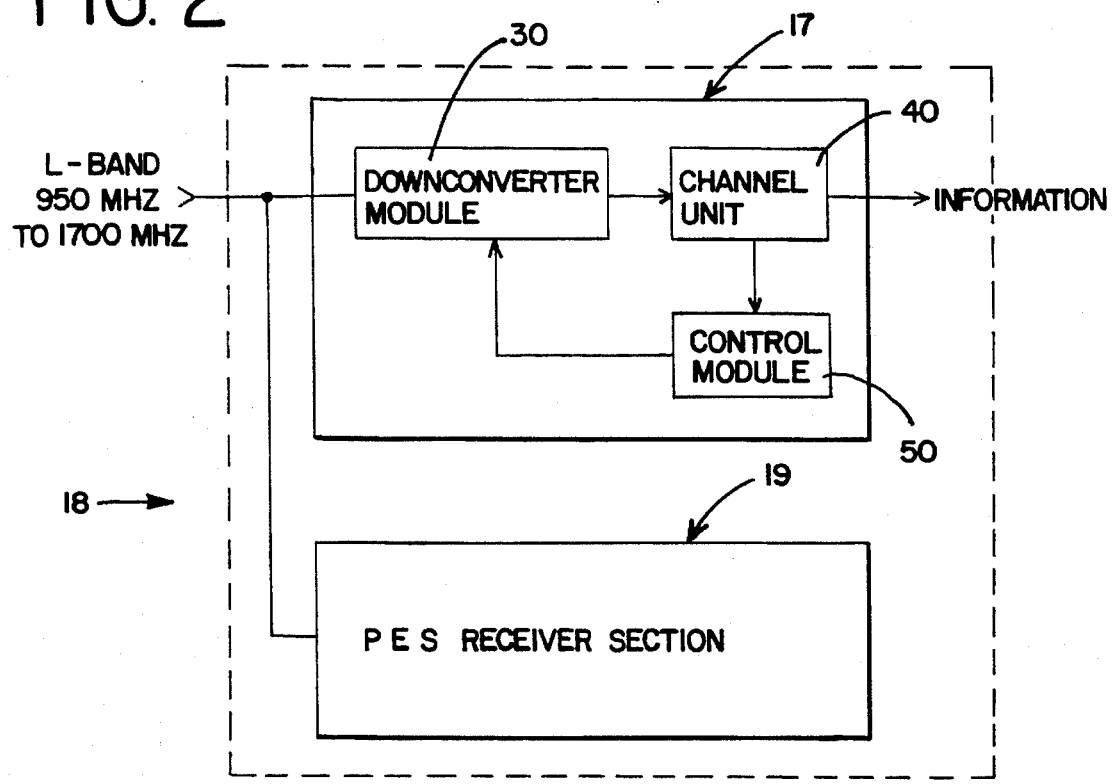
FIG. 2 is a block diagram of an L-band receiver circuit suitable for use in the hybrid earth station receiver of FIG. 1.

FIG. 2 is a block diagram of a preferred TES receiver section 17 embodying the present invention. The TES receiver section 17 includes a downconverter module 30, a channel unit 40, and a control module 50. Preferably, the downconverter module 30 is constructed on a portion of a larger circuit board occupied by the control module circuitry 50.

The downconverter module 30 receives the modulated L-band signals from the block downconverter 14 (shown in FIG. 1). The incoming L-band signals are preferably in the range from approximately 950 MHz to approximately 1700 MHz. The downconverter module 30 shifts a portion of the L-band signal to a first intermediate frequency (IF). Preferably, the first IF is centered at approximately 70 MHz and the shifted portion of the L-band signal is approximately 40 MHz wide. The downconverter 30 also receives a frequency correction output in a feedback loop from the control module 50. The downconverter 30 uses the frequency correction output to adjust for frequency offset detected in the channel unit 40 and translated in the control module 50.

The channel unit 40 receives the first IF and searches for predetermined carrier frequencies. The channel unit 40 accomplishes the search by shifting the first IF to a second, lower, IF and then sweeping the bandwidth around the second IF looking for signals to demodulate. The channel unit 40 demodulates the signals, generating both information signals and frequency offset outputs for use in adjusting the downconverter module 30 to compensate for any frequency offset that may exist.

The control module 50 receives the frequency offset output from the channel unit 40 and translates the frequency offset output into frequency correction output to be fed back to the downconverter module 30. In a preferred embodiment the frequency correction output is a digital signal. The control module 50 translates the frequency offset information by averaging the frequency offset information and computing the direction and speed that the downconverter module 30 must shift the first IF. The control module 50 limits the rate of frequency change such that the channel unit 40 can properly track the signal as it moves. In a preferred embodiment the control unit can instruct the downconverter module 30 to shift the first IF as much as ±300 kHz in approximately 10 Hz increments.

Figure 3:
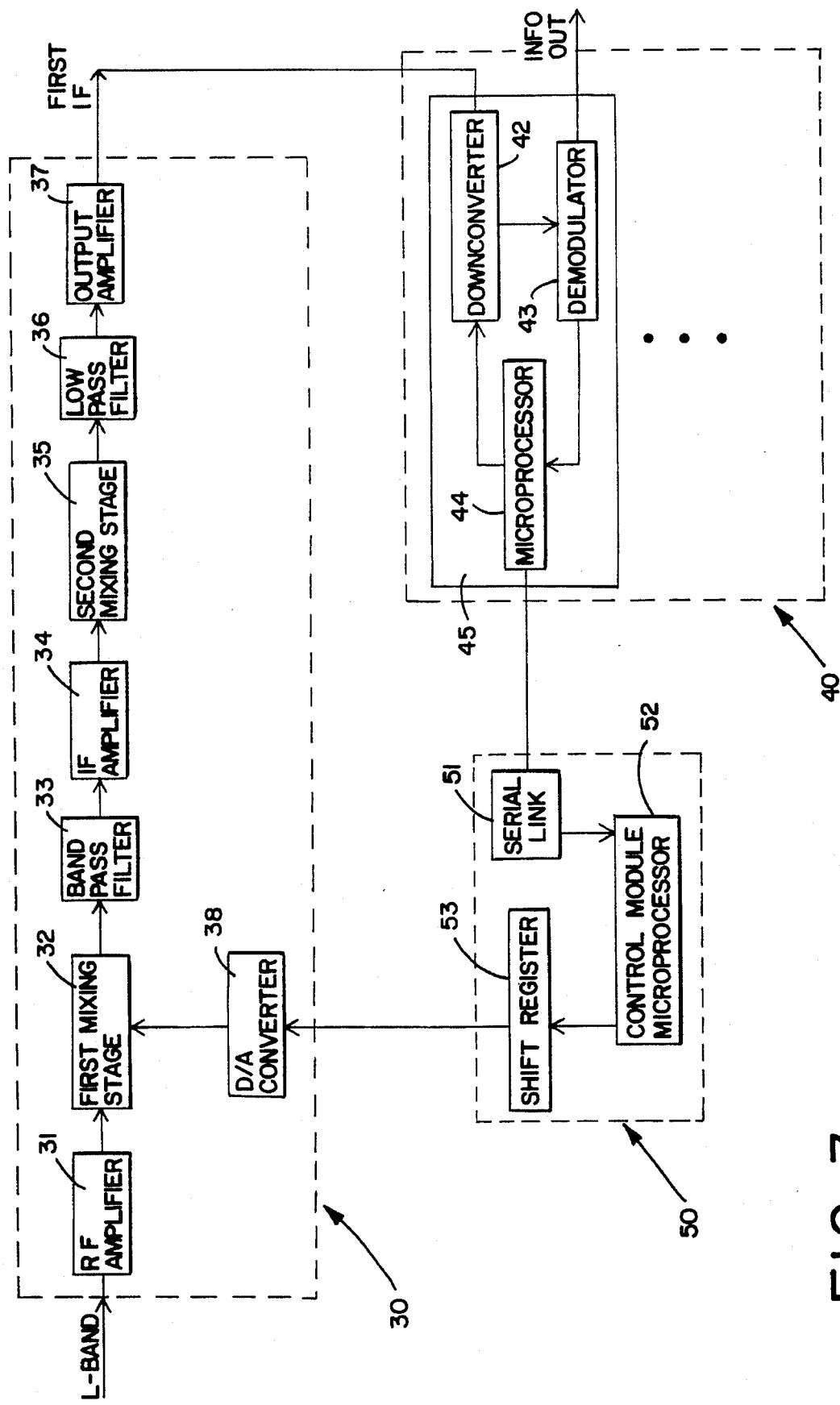
FIG. 3 is a block diagram illustrating in more detail the downconverter module, channel unit, and control module shown in FIG. 2.

FIG. 3 is a more detailed illustration of the downconverter module 30, channel unit 40 and control module 50 shown in FIG. 2. In a preferred embodiment, the downconverter module 30 includes a radio frequency (RF) amplifier stage 31, a first mixing stage 32, a band pass filter 33, an IF amplifier 34, a second mixing stage 35, a low pass filter 36, an output amplifier 37, and a digital to analog (D/A) converter 38. The RF amplifier stage 31 receives the modulated signals and amplifies the L-band signal level prior to the first mixing stage 32. The RF amplifier stage 31 is preferably an automatic gain control stage that amplifies the signals to a predetermined level. The first mixing stage 32 is coupled to the RF amplifier 31 and shifts the L-band down in frequency. The band pass filter 33 filters off the undesired harmonics and noise leaving the desired bandwidth of signals. The filtered signals are next amplified in an IF amplifier 34, preferably an automatic gain control circuit such as a Siemens BAR61, and shifted to the desired first IF in the second mixing stage 35. The shifted signals, now preferably a first IF centered at approximately 70 MHz, are filtered in a low pass filter 36. After passing through the low pass filter 36, the first IF is amplified in an output amplifier 37 and leaves the downconverter module 30. The output amplifier 37, in a preferred embodiment, is an Avantek INA 02186 amplifier.

The D/A converter 38 is preferably coupled to the first mixing stage 32. The D/A converter 38, such as an Analog Devices AD1851, translates the digital correction output from the control module 50 into a tuning voltage for tuning the first mixing stage 32 and shifting the IF to correct for detected offset. In another preferred embodiment, the D/A converter 38 is coupled to the second mixing stage 35 for tuning the IF with the second mixing stage 35 rather than the first mixing stage 32.

Figure 4:
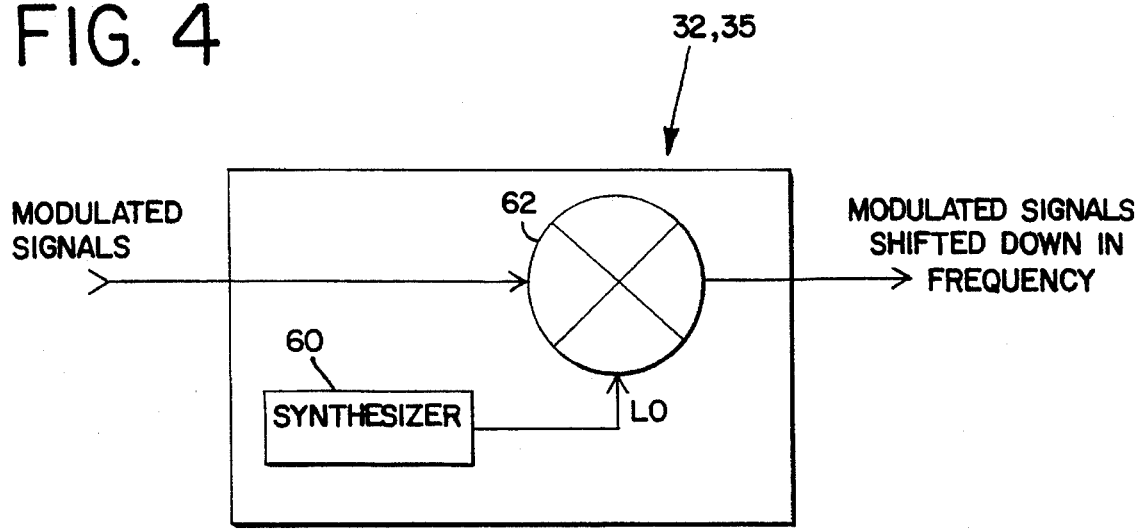
FIG. 4 is a block diagram of the mixing stage used in the downconverter shown in FIG. 3.

The first and second mixing stages 32, 35 are shown in more detail in FIG. 4. The first and second mixing stages 32, 35 each include a frequency synthesizer 60 and a mixer 62. The frequency synthesizer 60 generates a local oscillator (LO) frequency for mixing with the modulated signals fed to the mixer 62. The mixer 62 mixes the LO and the modulated signals to shift the modulated signals down in frequency. Each of the mixing stages 32, 35 generates a different LO frequency such that the L-band signals are shifted down to an IF, preferably centered at approximately 70 MHz, after passing through both mixing stages 32, 35. The mixer 62 in the first mixing stage 32 may be a Synergy SNDC3 mixer. The mixer 62 in the second mixing stage 35 may be a Siemens PMB2306 mixer.

The synthesizer 60 in each mixing stage 32, 35 is preferably a phase-lock-loop (PLL) technology tunable synthesizer but may be any synthesizer capable of fine frequency tuning. A presently preferred embodiment includes a voltage controlled crystal oscillator (VCXO) in the first mixing stage 32 to receive the tuning voltage from the D/A converter 38. The tuning voltage tunes the synthesizer 60 in the first mixing stage 32, which causes the modulated signals to be shifted by an amount that compensates for the offset detected in the channel unit 40. The second mixing stage 35, rather than the first mixing stage 32, may receive the frequency correction tuning voltage in another preferred embodiment.

In yet another embodiment, the downconverter module 30 does not have a D/A converter 38 and the digital frequency correction output of the control unit 50 connects directly to the synthesizer 60 of either the first or second mixing stages 32, 35. The synthesizer 60 receives the frequency cancellation feedback directly from the control module 50. Preferably, the synthesizer 60 is a direct digital synthesizer capable of fine frequency tuning.

Returning now to FIG. 3, a first IF signal is fed from the output amplifier 37 to the channel unit 40. Preferably, the channel unit 40 has at least one channel decoder 45. The channel unit 40 may have telephony-earth-station (TES) channel decoders for primarily voice communication, personal-earth-station (PES) decoders for primarily data communications, or a mixture of both. By definition, a hybrid-earth-station (HES) receiver 18 is designed to handle both TES and PES signals. While PES technology does not need the same frequency offset cancellation as TES, a single downconverter module 30, as in the present invention, may be used for both. Preferably, the channel unit 40 contains one or more channel decoders 45 of the TES type. In another preferred embodiment, both TES and PES channel decoders 45 may be used in the TES receiver section 17 (FIG. 1).

Each channel decoder 45 contains a downconverter 42 for shifting the first IF to a frequency that can be demodulated, a demodulator 43, and a channel decoder microprocessor 44. Each channel decoder downconverter 42 receives the first IF and shifts the first IF to a second IF. A NEC UPC1686 is suitable for use as the downconverter 42.

The demodulator 43 is connected to the downconverter 42. The demodulator 43 receives the second IF and retrieves information from the particular carrier frequency that the particular channel decoder 45 is assigned to. The demodulator 43, in addition to producing an information signal, produces frequency offset data. The demodulator 43 preferably sends offset data, representative of the offset it detected, in 1 Hz increments. A Texas Instruments TMS320C is suitable for use as the demodulator 43. The channel decoder microprocessor 44, which may be implemented as an Intel 80C188, receives the offset data and feeds back a frequency offset output to the downconverter 42 in the channel unit 40. The frequency offset output causes the decoder downconverter 42 to sweep for its preassigned carrier frequency when it is initially acquiring the carrier frequency or when the carrier frequency shifts more than a threshold amount. Additionally, each channel decoder microprocessor 44 transmits a frequency offset output to the control module 50. The frequency offset output fed back to the control module 50 contains the total offset measured. Preferably, each microprocessor 44 transmits information indicating whether or not the signal has been found and what the offset is in 10 Hz increments. Frequency offset may be determined by any suitable method such that a frequency offset output, translatable by a microprocessor, is generated. A preferred method of determining frequency offset is described later in this disclosure.

The frequency offset output data transmitted to the control module 50 arrives first at a serial link 51 and is forwarded to the control module microprocessor 52. In a preferred embodiment, the microprocessor 52 averages the offset information from each channel decoder 45 and controls the rate that downconverter module 30 is sent frequency offset corrections. The control module microprocessor 52, preferably a Siemens 80C535, sends a frequency offset cancellation output through a shift register 53 to the D/A converter 38 on the downconverter module 30. In a preferred embodiment, the frequency offset cancellation output is a digital signal that is converted by the D/A converter 38 to an analog voltage.

Figure 5:
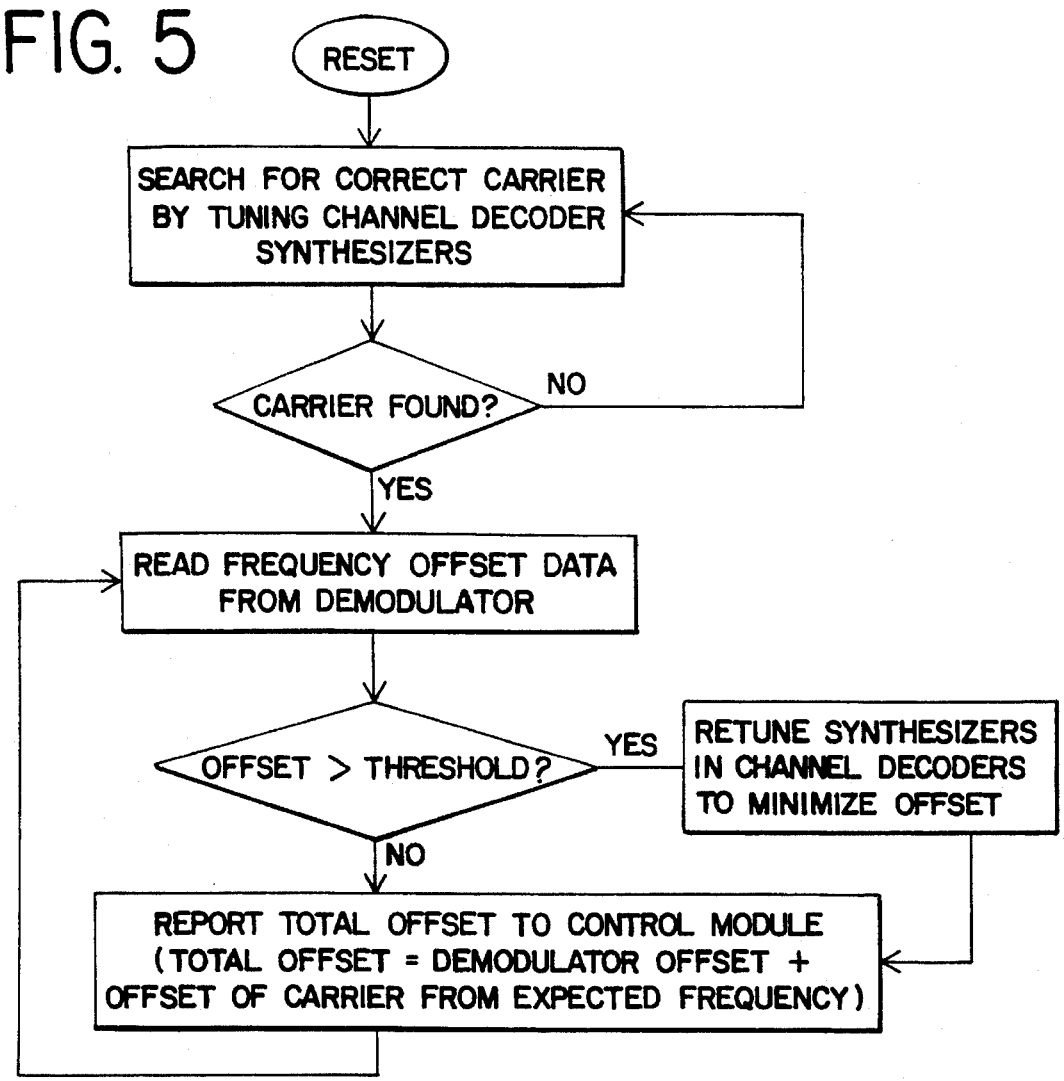
FIG. 5 is a flowchart showing the steps of a searching and tracking computer program that may be used to compensate for the detected frequency offset.

FIG. 5 illustrates the steps that the channel unit 40 makes in searching for, acquiring and then tracking the desired carrier frequencies. In first searching for the carrier, each channel decoder 45 in the channel unit 40 tunes its downconverter 42 to find its preassigned carrier frequency. The channel decoder microprocessor 44 instructs the downconverter 42 to sweep frequency segments of the second IF until the carrier is found. Preferably, the frequency segments are approximately 400 Hz. Once the assigned carrier frequency has been found, the carrier is constantly tracked by the channel decoder microprocessor 44 using frequency offset data generated by the demodulator 43.

While the carrier frequency being tracked remains within a predetermined frequency threshold, the channel unit 40 transmits the frequency offset output to the control module 50. Each channel decoder microprocessor 44 calculates frequency offset by adding offset detected by the demodulator 43 to the frequency offset of the synthesizer in the channel decoder downconverter 42. The frequency offset in the channel decoder downconverter 42 is the amount the microprocessor 44 has tuned the synthesizer in the downconverter 42 from its preset default frequency. If the frequency being tracked deviates an amount greater than a preset threshold, both the synthesizer in the channel decoder downconverter 42 and the downconverter module 30 are tuned to compensate.

In a preferred embodiment, the channel decoder downconverter 42 is a coarse frequency tuner capable of tuning in approximately 400 Hz increments. The coarse tune feedback loop is entirely within the one or more channel decoders 45 in the channel unit 40. Specifically, the coarse tune feedback loop includes the tunable downconverter 42, the demodulator 43, and the channel decoder microprocessor 44 in each channel decoder 45. Once the signal is acquired, fine tuning is accomplished by the control module 50 which can tune the downconverter module 30 in 10 Hz increments. The fine tune feedback loop consists of the downconverter module 30, the channel unit 40, and the control module 50.

A preferred method of canceling received frequency offset is to calculate the offset by averaging frequency offset data from all the channel decoders 45. This method provides a redundancy check benefit in case a particular channel decoder 45 is providing erroneous data. Alternatively, a preferred embodiment of the present invention includes randomly selecting, or preselecting one channel decoder 45 to provide the frequency offset data. Because any frequency offset introduced in the frequency shifting chain from the antenna 12 should affect all of the carrier frequencies equally, the error detected for a particular carrier frequency will be the same for all carrier frequencies.

In summary, the foregoing describes a method and device for canceling frequency offset in received modulated signals. The method and device utilize a feedback loop that finely tunes a single L-band downconverter in the receiver to correct for any frequency offset detected in the one or multiple channel decoders. This provides a simple design that does not require highly accurate and expensive oscillators. Additionally, the frequency tracking of the present method and device is accurate enough for use in TES communications that are generally sensitive to frequency offsets.

It is intended that the foregoing detailed description be regarded as illustrative rather than limiting, and that it be understood that it is the following claims, including all equivalents, which are intended to define the scope of this invention.

What is claimed is:

1. A device for canceling frequency offsets in received modulated signals, the device comprising:

a downconverter module receiving the modulated signals in a predetermined frequency range, and shifting the modulated signals to a first IF; and a channel unit receiving the first IF, said channel unit comprising at least one channel decoder, and each of the channel decoders generating an information signal and a frequency offset output, said frequency offset output coupled to the downconverter for adjusting the downconverter to compensate for any frequency offset, wherein the channel unit shifts the first IF to a second IF, demodulates the second IF, and generates an information signal.

2. A device according to claim 1 further comprising:

a control module receiving the frequency offset output from the channel unit, translating the frequency offset output into a frequency correction output, and sending the frequency correction output to the downconverter module.

3. A device according to claim 2 wherein the downconverter module comprises:

an RF amplifier stage receiving the modulated signals;

a first mixing stage coupled to the RF amplifier stage;

a band pass filter coupled to the first mixing stage;

an IF amplifier coupled to the bandpass filter;

a second mixing stage coupled to the IF amplifier stage and shifting the modulated signals to the first IF; and a D/A converter coupled to the first mixing stage, receiving the frequency correction output sent by the control module, and converting the frequency correction output to an analog tuning voltage for tuning the first mixing stage.

4. A device according to claim 3 wherein the first and second mixing stages each comprise:

a frequency synthesizer for generating an LO frequency; and a mixer for mixing the generated LO frequency with the modulated signals to shift the modulated signals down in frequency.

5. A device according to claim 4 wherein the frequency synthesizer of the first mixing stage is tunable and receives an analog tuning voltage from the D/A converter.

6. A device according to claim 5 wherein the synthesizer in the first mixing stage is tunable such that the shifted band of modulated signals may be shifted up to ±300 kHz.

7. A device according to claim 2 wherein each channel decoder comprises:

a downconverter receiving the first IF and shifting the first IF to the second IF;

a demodulator receiving the second IF, generating the information signal and generating frequency offset data; and a microprocessor receiving the frequency offset data, controlling the downconverter to search for the modulated signal, and producing a total frequency offset data output for output to the control module.

8. A device according to claim 2 wherein the channel unit comprises:

at least one telephony-earth-station channel decoder for demodulating voice signals; and at least one personal-earth-station channel decoder for demodulating data signals.

9. A device according to claim 7 wherein each channel decoder is preassigned to search for and demodulate a particular carrier frequency.

10. A device as in claim 9 wherein the microprocessor in each channel decoder produces a frequency offset output for the control module and produces a frequency correction output for feedback to the downconverter in the channel decoder.

11. A device as in claim 9 wherein a preselected channel decoder in the channel unit produces a frequency offset output for the control module and produces a frequency correction output for feedback to the downconverter in the channel decoder.

12. A device according to claim 2 wherein the control module comprises:

a serial link for receiving frequency offset output;

a microprocessor coupled to the serial link; and a shift register coupled to the microprocessor for transmitting a frequency correction output to the downconverter module.

13. A method of canceling frequency offset in received modulated signals, the steps comprising:

receiving the modulated signals in a predetermined frequency range at a downconverter;

shifting the modulated signals to an IF;

detecting a frequency offset in a channel unit having at least one channel decoder;

producing a frequency offset output at each of the channel decoders;

calculating the amount of frequency offset;

feeding back frequency offset correction output to the downconverter; and tracking the modulated signals after the modulated signals have been found.

14. The method according to claim 13 wherein the step of feeding back offset correction output further comprises acquiring the signal with a coarse tune feedback loop and tracking the acquired signal with a fine tuning feedback loop.

* * * * *